(12) United States Patent
Wyckoff et al.

(10) Patent No.: US 12,106,336 B2
(45) Date of Patent: Oct. 1, 2024

(54) CUSTOMER FACING MEDIA AND RENEWABLE TECHNOLOGY INTEGRATOR ASSEMBLY

(71) Applicant: Verogy Holdings, LLC, West Hartford, CT (US)

(72) Inventors: Jeffrey M. Wyckoff, Bella Vista, AR (US); William H. Herchel, West Hartford, CT (US); Steven J. DeNino, Bristol, CT (US); Bryan J. Fitzgerald, Shelton, CT (US)

(73) Assignee: Verogy Holdings, LLC, West Hartford, CT (US)

( * ) Notice: Subject to any disclaimer, the term of this patent is extended or adjusted under 35 U.S.C. 154(b) by 683 days.

(21) Appl. No.: 17/119,672

(22) Filed: Dec. 11, 2020

(65) Prior Publication Data
US 2021/0182919 A1    Jun. 17, 2021

Related U.S. Application Data

(60) Provisional application No. 62/946,607, filed on Dec. 11, 2019.

(51) Int. Cl.
G06Q 30/02 (2023.01)
B60L 53/30 (2019.01)
(Continued)

(52) U.S. Cl.
CPC ........ *G06Q 30/0281* (2013.01); *B60L 53/305* (2019.02); *B60L 53/31* (2019.02); *B60L 53/51* (2019.02); *B60L 53/53* (2019.02); *B60L 53/60* (2019.02); *H02J 3/381* (2013.01); *G06F 3/14* (2013.01); *G06Q 50/01* (2013.01); *H02J 7/35* (2013.01); *H02J 2300/24* (2020.01)

(58) Field of Classification Search
CPC .. G06Q 30/0281; G06Q 50/01; B60L 53/305; B60L 53/31; B60L 53/51; B60L 53/53; B60L 53/60; B60L 53/30; H02J 3/381; H02J 7/35; H02J 2300/24; H02J 7/0013; G06F 3/14; Y04S 50/14; Y02E 10/56; Y02T 10/70; Y02T 10/7072; Y02T 90/12; Y02T 90/16
USPC .................................................. 705/1.1–912
See application file for complete search history.

(56) References Cited

U.S. PATENT DOCUMENTS

2005/0161067 A1\* 7/2005 Hollins .................. A45B 23/00
135/16
2006/0207192 A1\* 9/2006 Durham ................ E04B 1/3416
52/73

(Continued)

*Primary Examiner* — Jonathan P Ouellette
(74) *Attorney, Agent, or Firm* — Robinson & Cole LLP

(57) ABSTRACT

A customer engagement platform assembly includes a base configured to be secured to a terrain, a support column fixedly secured to the base and extending outwardly therefrom. The assembly includes a frame removably secured to the mounting base and having a height extension section, a display mounting section removably secured to the height extension section, and a cover extending over the display mounting section. The display mounting section includes one or more audio video communication devices for communicating information therefrom. The assembly includes a bracket system in fixed relation to the support column and extending through the frame. The audio video communication device is removably secured to the bracket system.

16 Claims, 15 Drawing Sheets

(51) Int. Cl.
*B60L 53/31* (2019.01)
*B60L 53/51* (2019.01)
*B60L 53/53* (2019.01)
*B60L 53/60* (2019.01)
*G06Q 10/10* (2023.01)
*G06Q 30/06* (2023.01)
*H02J 3/38* (2006.01)
*G06F 3/14* (2006.01)
*G06Q 50/00* (2012.01)
*H02J 7/35* (2006.01)

(56) References Cited

U.S. PATENT DOCUMENTS

| | | | |
|---|---|---|---|
| 2010/0000596 A1* | 1/2010 | Mackler | H01L 31/02 136/246 |
| 2013/0080254 A1* | 3/2013 | Thramann | B60L 53/68 705/14.57 |
| 2013/0300362 A1* | 11/2013 | Turner | G06Q 30/0272 320/109 |
| 2015/0113987 A1* | 4/2015 | Mackler | H02S 20/23 60/641.2 |
| 2016/0294022 A1* | 10/2016 | Thramann | B60L 53/65 |
| 2016/0294199 A1* | 10/2016 | Poffinbarger | H02S 20/20 |
| 2017/0318921 A1* | 11/2017 | Gharabegian | F24S 30/452 |
| 2018/0041159 A1* | 2/2018 | DeBartolo, III | F24S 25/13 |
| 2020/0036325 A1* | 1/2020 | Poivet | H02S 30/20 |

* cited by examiner

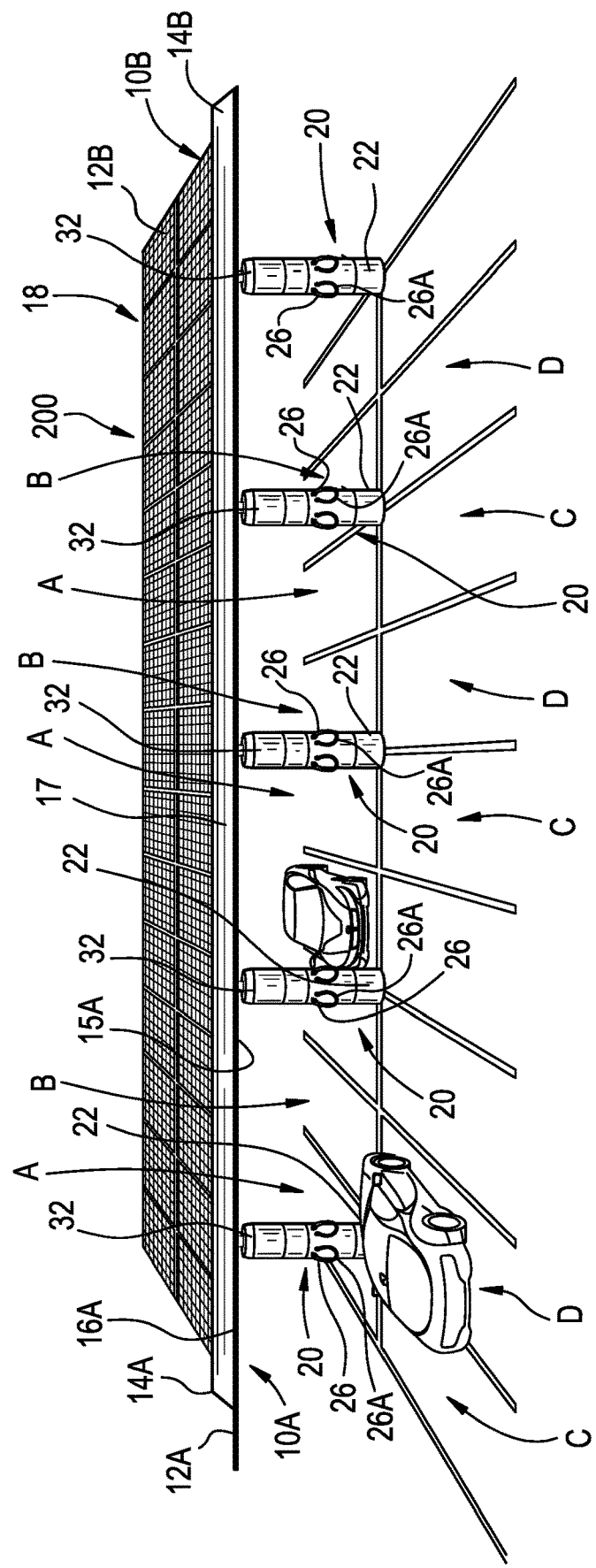

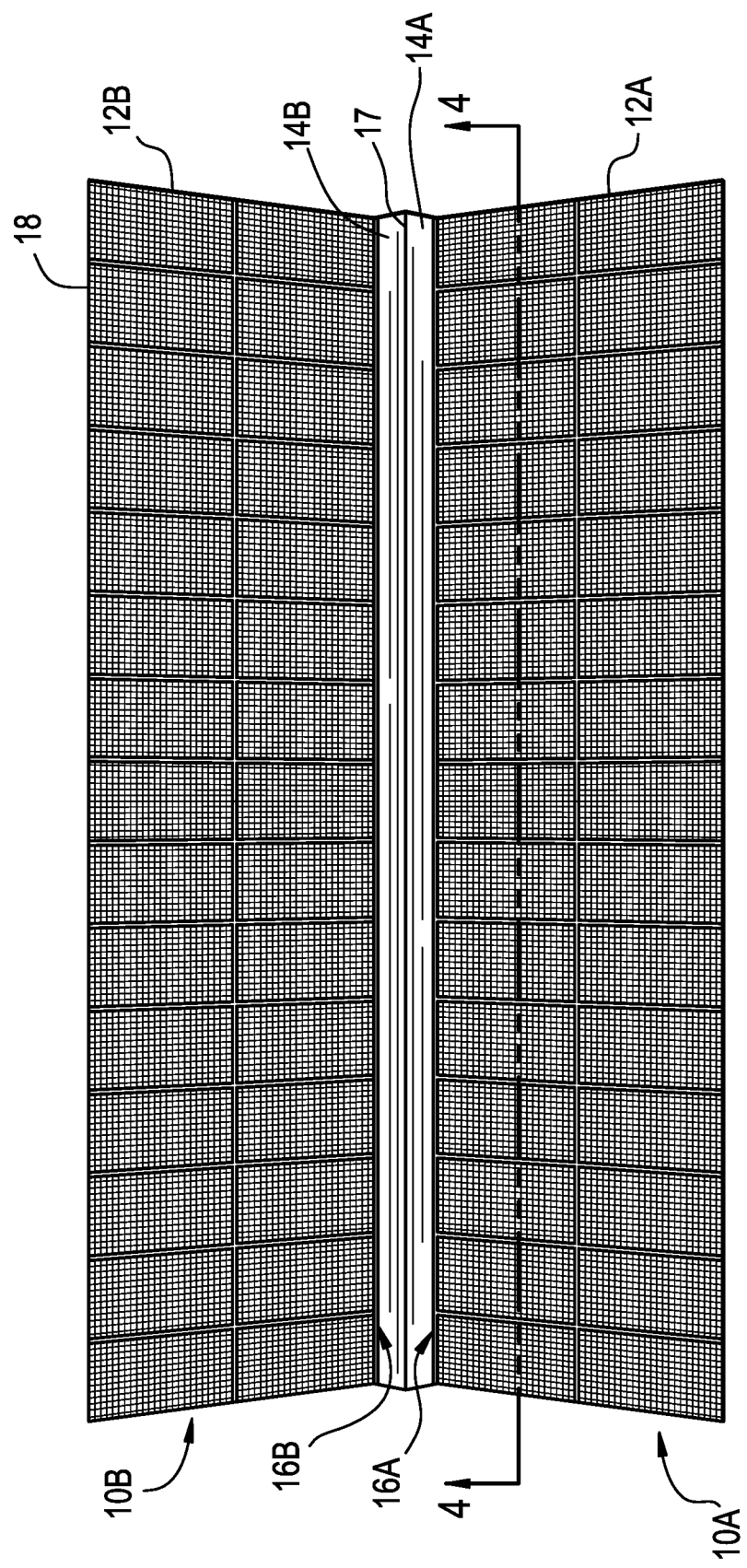

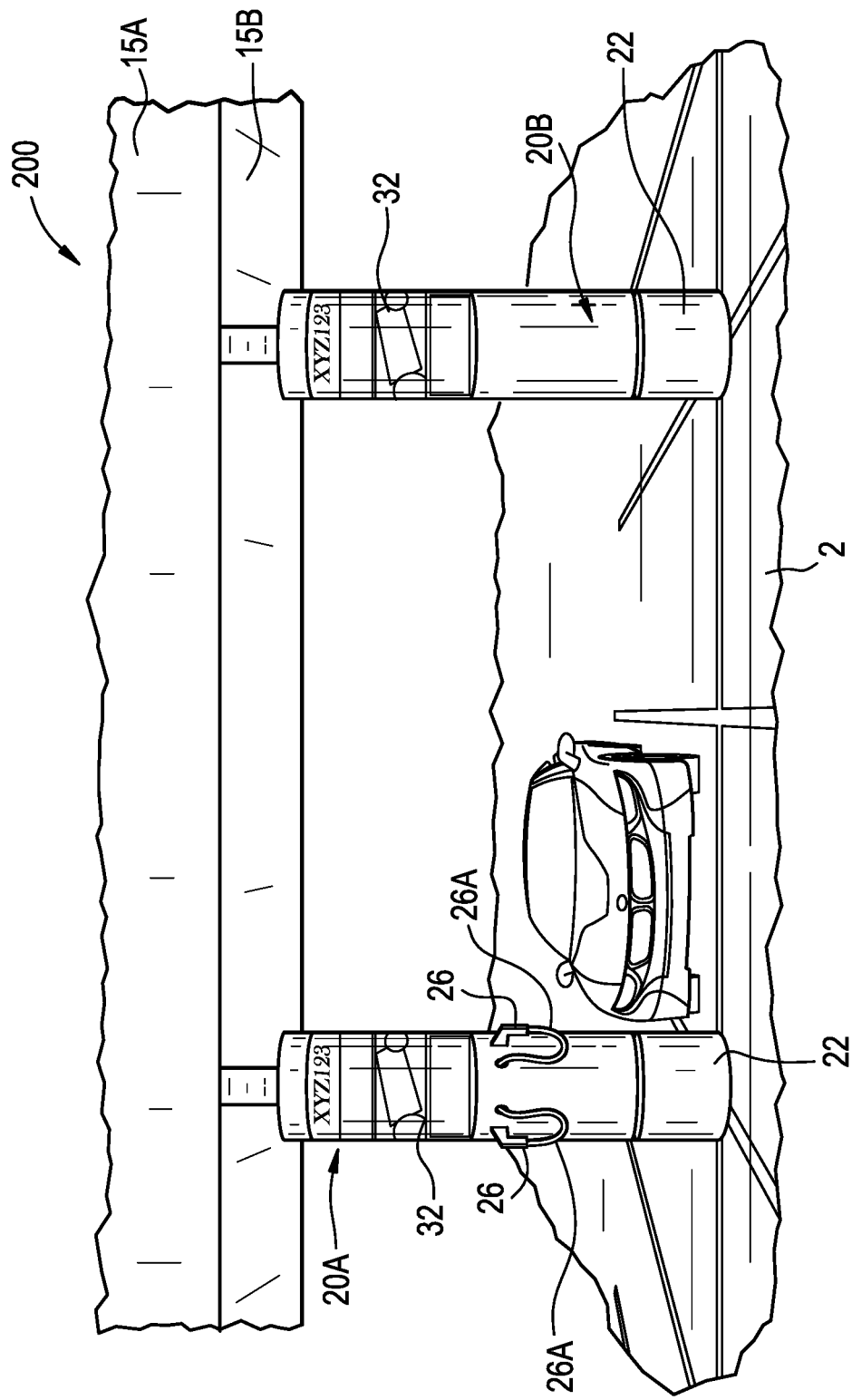

FIG. 6C
FIG. 6D
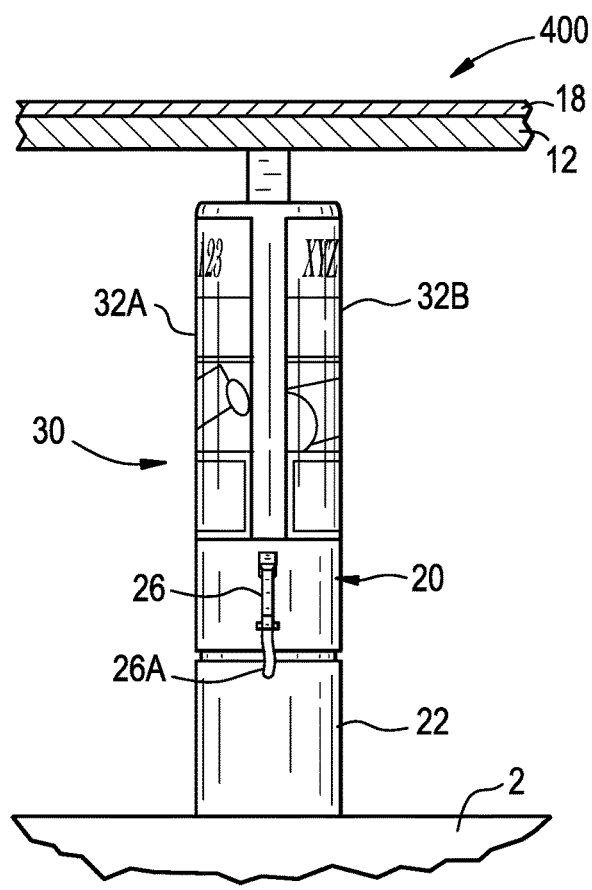
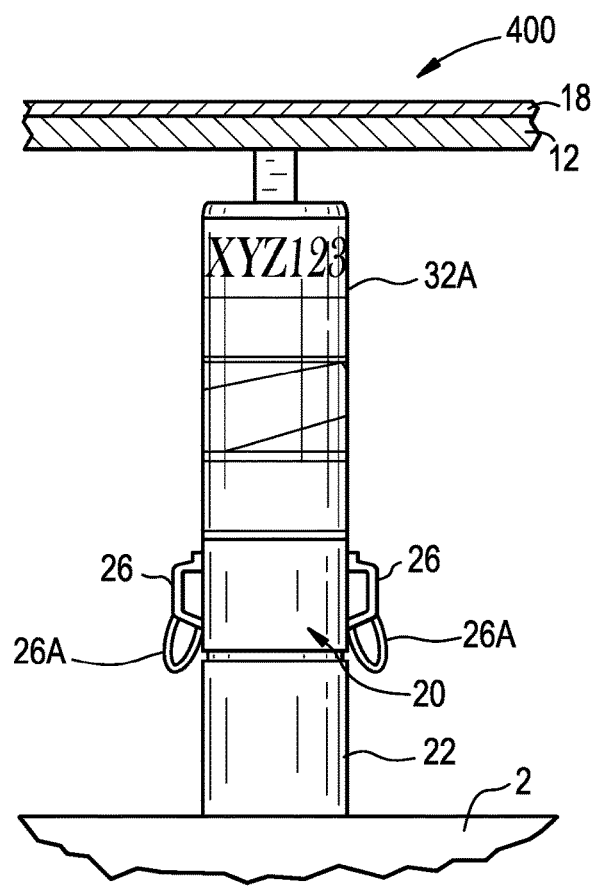

CUSTOMER FACING MEDIA AND RENEWABLE TECHNOLOGY INTEGRATOR ASSEMBLY

CROSS REFERENCE TO RELATED APPLICATION

This application claims the benefit of U.S. Provisional Patent Application Ser. No. 62/946,607 filed on Dec. 11, 2019, which is incorporated herein by reference in its entirety.

FIELD OF THE INVENTION

The present invention relates generally to an assembly of a technology enabled, real estate customer engagement platform to address the needs of growing commerce demands of commercial parking lots and similar parking space area with flexibility for integration of weather canopy, solar photovoltaic canopy, energy storage, and charging stations for electric vehicles for commercial parking lots.

BACKGROUND OF THE INVENTION

Current forms of "curbside pickup" and other similar forms of commerce located in commercial parking lots of vendors and proprietors, that bridges traditional "bricks and mortar" and ecommerce activities have access problems that make it difficult for customers to send and receive communications to and from the vendors and proprietors.

Current forms of "curbside pickup" and other similar forms of commerce located in commercial parking lots of vendors and proprietors, lack an "enhanced customer experience," corporate "branding" presence, and "waypoint" identification of parking lot commerce services.

Current forms of "curbside pickup" and other similar forms of commerce as well as traditional Electric Vehicle ("EV") charging stations located in commercial parking lots of vendors and proprietors, lack design and physical footprints that allow for continued expansion into all areas of these parking lots.

Vendors and proprietors are losing sales because "impulse" sales that may otherwise occur during interior visits to the site are not occurring because of curb side pickup.

Some customers arrive at the parking lots in electric vehicles and may have long waits that drain the battery in their electric vehicles. However, such parking lots do not have any means for charging the electric vehicle. Most parking lots do not provide shelter for persons and their vehicles.

Some proprietors are looking for means to offset utility and energy cost and/or increase renewable energy usage, as well as more visible Corporate Social Responsibility efforts.

SUMMARY

There is disclosed herein, a fully integrated customer engagement platform assembly that is a technology enabled consumer/citizen engagement platform for expanding commerce opportunities in outdoor commercial spaces, with ability to integrate weather protection, providing shelter for persons, goods and their vehicles, and technology to inform and connect with persons/consumers in and around such media engagement systems installed on a typical parking lot substrate such as concrete parking lot pole base with a number of vehicle transient locations such as parking spaces, clean and flexibility to integrated renewable energy generation systems, energy storage systems, and electric vehicle charging stations/systems.

The present invention includes an arrangement of customer engagement platform assemblies. The arrangement includes a first vehicle transient location located on a terrain and a second vehicle transient location located on the terrain. The first vehicle transient location is positioned adjacent to the second vehicle transient location. The arrangement includes a customer engagement platform assembly positioned at a junction between the first vehicle transient location and the second vehicle transient location. The customer engagement platform assembly includes a first audio video communication device and a second audio video communication device. The first audio video communication device is positioned towards and viewable from the first vehicle transient location and the second audio video communication device is positioned towards and viewable from the second vehicle transient location.

The customer engagement platform includes network, media, and communications equipment, with digital real estate in form of a signal digital screen or multiple digital screens to support advertisements and information that are customized to each of the vehicle transient locations to enable communication from proprietor to consumer/persons in proximity to customer engagement platform.

In some embodiments, the control unit includes network equipment, communication protocols, Internet protocol address targeting, geo-fencing, geo-targeting, online behavioral targeting, text bot and/or apps enabled communication protocols to enable communication and/or efficiency of services between the at least two entities.

The present invention includes a customer engagement platform assembly that includes a base configured to be secured to a terrain and a support column fixedly secured to the base and extending outwardly therefrom. The customer engagement platform assembly includes a frame removably secured to the mounting base, the frame includes a height extension section, a display mounting section removably secured to the height extension section and a cover that extends over the display mounting section. The display mounting section includes one or more audio video communication devices (e.g., 2, 3, or four display screens) for communicating information therefrom. The customer engagement platform assembly includes a bracket system that is in fixed relation to the support column and extends through the frame. The audio video communication devices are removably secured to the bracket system.

In some embodiments, the frame houses and supports an electrical power supply and a control unit both of which are in communication with the at least one audio video communication device.

In some embodiments, the height extension section, the display mounting section and/or the cover have one or more access features (e.g., an access port, a window, a hinged door, and a multiple piece assembly) configured to provide access to internal areas inside the height extension section, the display mounting section, and the cover.

In some embodiments, the bracket system includes a shelving system secured to the support column and/or a centrally located shaft secured to the support column and having one or more arms radially extending from the centrally located shaft to the audio video communication devices.

In some embodiments, the customer engagement platform includes Internet protocol address targeting, geo-fencing and other forms of geo-targeting, and online behavioral targeting, text bot and/or app enabled communication protocol to enable communication and efficiency of services between the customer and proprietor.

In some embodiments, the customer engagement "column" assembly has external features that are aesthetically changed to accommodate the branding request of a partner, client, and/or proprietor.

In some embodiments, the display mounting section has a substantially cylindrical exterior surface and the at least one audio video communication device has an arcuate shape complementary to the cylindrical exterior surface of the mounting section.

A customer engagement system is a column of both cylindrical and cylindrical/rectangular shapes that is fixed to a concrete base mounted on the parking lot substrate (concrete, asphalt or the like) with a support beam centered through concrete base and raising up through the column for structural support.

In some embodiments, the display mounting section has a rectangular cross section and has at least two flat exterior surfaces and the at least one audio video communication device has a flat shape complementary to the at least two flat exterior surfaces of the mounting section.

In some embodiments, the arrangement includes one or more electric vehicle charging stations disposed on the customer engagement platform assembly. The electric vehicle charging stations are accessible from the first vehicle transient location and/or the second vehicle transient location.

In some embodiments, the customer engagement platform assembly includes one or more (e.g., 1, 2, 3, or four) electric vehicle charging stations disposed on the frame and in electrical communication with the power supply. The electric vehicle charging stations are configured to charge a battery for an electric vehicle.

In some embodiments, the fully integrated customer engagement system assembly includes up to 4 electric vehicle charging stations per column disposed on the support post and largely internal to the customer engagement "column," and the electricity is provided directly to the electric vehicle charging station.

In some embodiments, the customer engagement platform assembly can include weather proofing in form of a shaded Photovoltaic canopy structure that acts as both environmental protection for consumers, their vehicles, and proprietors, employees, and goods during product transfer, as well as a "Waypoint" structure of identification of service locations on the site. In addition, the solar canopy structure has a first deck and a second deck fixed to one another along a valley. An upper surface of the first deck defines a mounting surface for solar photovoltaic modules that each receive energy from light rays and convert the energy from light rays into electricity. The first deck, the second deck, and the valley all have a bottom surface. At least one support post extends from a mounting pad to the bottom surface of the first deck, the second deck, and/or the valley.

In some embodiments, the canopy structure comprises an upwardly facing mounting surface has one or more solar photovoltaic modules configured to receive energy from light rays and convert the energy into electricity.

In some embodiments, the solar photovoltaic module is in electrical communication with an electrical power supply and a control unit both of which are in communication with the at least one audio video communication device.

In some embodiments, the solar photovoltaic modules are in electrical communication with a utility electric grid, a battery storage device, and a remote electrical load spaced apart from the customer engagement platform assembly.

In some embodiments, the customer engagement platform assembly can include weather proofing in form of a shaded canopy structure that acts as both environmental protection for consumers, their vehicles, and proprietors, employees, and goods during product transfer, as well as a "Waypoint" structure of identification of service locations on the site. The structure has a first deck and a second deck fixed to one another along a valley. An upper surface of the first deck defines a mounting surface for a fabric or metal decking substrate with the function of providing shading and weather protection. The first deck, the second deck, and the valley all have a bottom surface. At least one support post extends from a mounting pad to the bottom surface of the first deck, the second deck, and/or the valley.

In some embodiments, the support column extends through the frame and extends outwardly from the cover. The canopy structure fixedly secured to the support column and extending radially outward from the support column and over the customer engagement platform assembly.

In some embodiments, the canopy structure comprises a first deck and a second deck fixed to one another along a valley.

In some embodiments, the canopy structure comprises an upwardly facing mounting surface having at least one of a fabric and a metal substrate configured to provide shading and weather protection for the customer engagement platform assembly.

In some embodiments, the customer engagement platform and energy engagement system assembly include battery storage equipment to store onsite electricity generation storage to facilitate offset of realized energy needs of customer engagement system and other site needs. In some embodiments, the electricity is provided directly to the communications device of the media engagement system, and in other embodiments stored or generated electricity is applied to other site needs or utility grid programs.

DESCRIPTION OF THE DRAWINGS

FIG. 2B is a partial cross section perspective view of the customer engagement platform assembly of FIG. 2A;

FIG. 3 is a top view of the solar photovoltaic canopy of the customer engagement platform assembly of FIG. 2A;

FIG. 4 is a partial front view of the customer engagement platform assembly of FIG. 2A taken across section 4-4 of FIG. 3;

FIG. 6C is a front cross section view of the customer engagement platform assembly of FIG. 6A with the first desk and the solar photovoltaic modules depicted in cross section for convenience used with the customer engagement system of FIG. 2A;

FIG. 6D is a side cross section view of the customer engagement platform assembly of FIG. 6C with the first deck and the solar photovoltaic modules depicted in cross section for convenience;

DETAILED DESCRIPTION OF THE PREFERRED EMBODIMENT

Figure 1A:
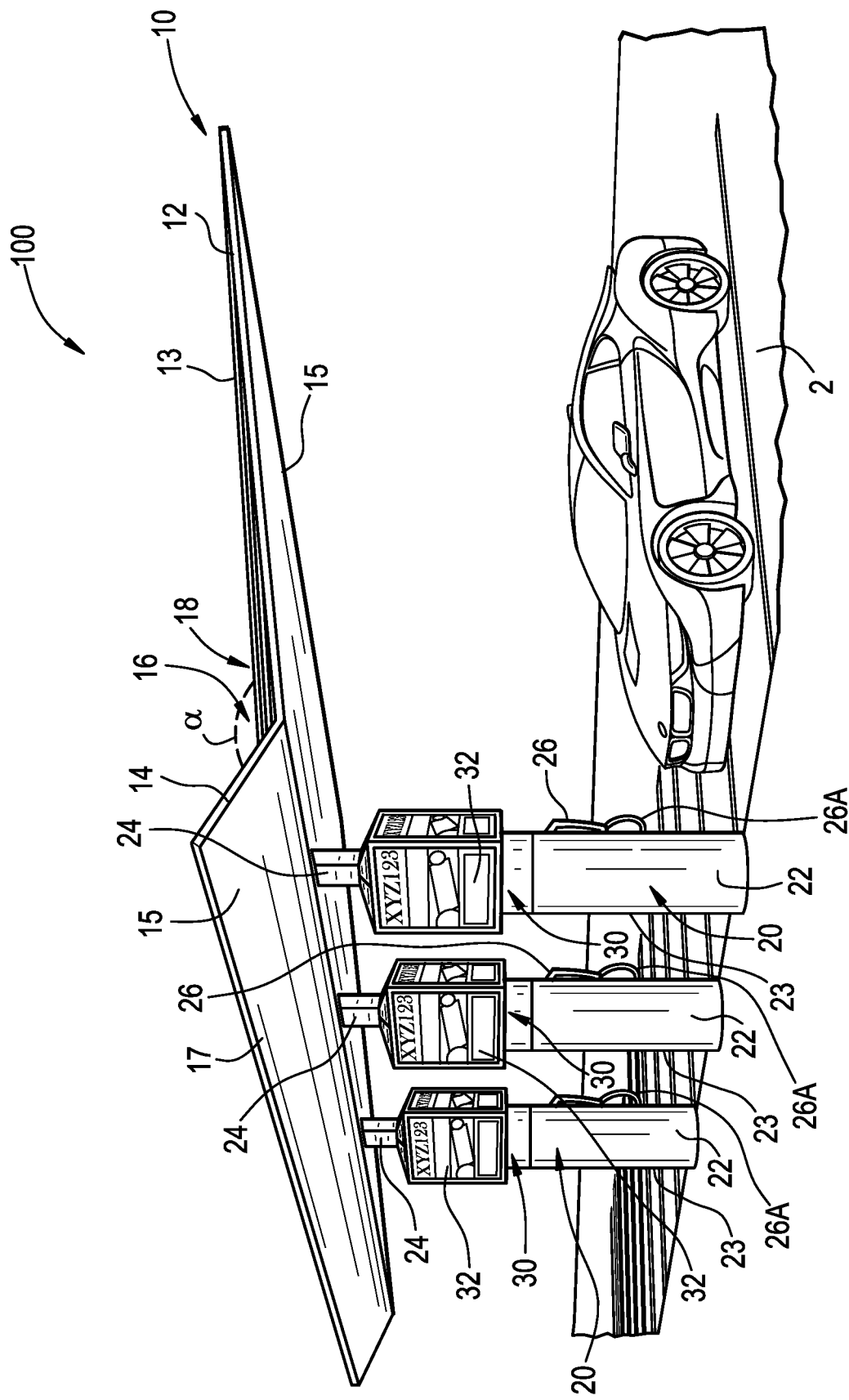
FIG. 1A is a perspective view of a first embodiment of the customer engagement platform assembly according to the present disclosure.
Figure 2A:
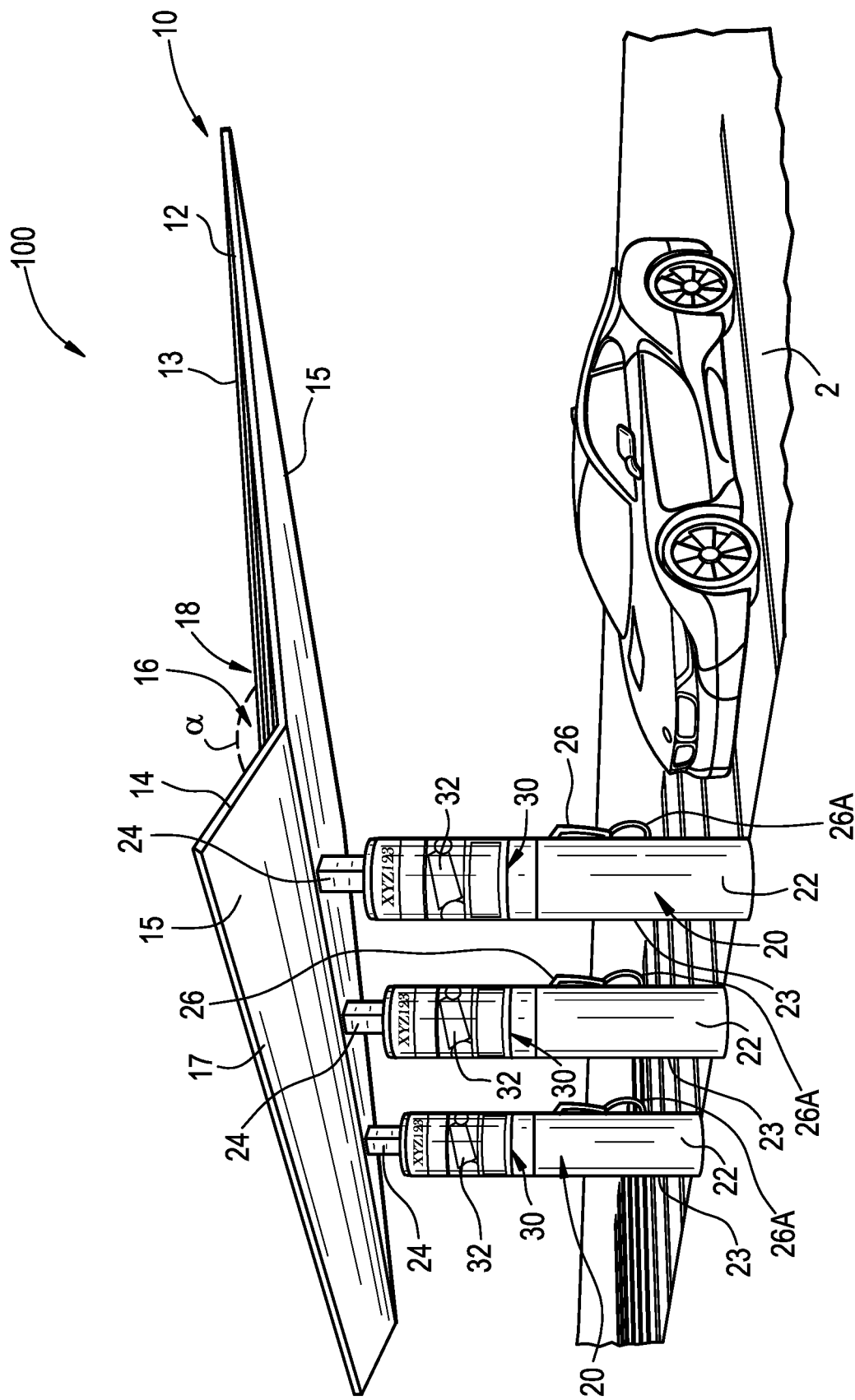
FIG. 2A is a perspective view of a second embodiment of the customer engagement platform assembly according to the present disclosure.

FIGS. 1A and 2A depict a customer engagement platform assembly 100 including a canopy structure 10, a support post 20, and a customer engagement system 30 fixed to the support post 20. In the embodiments depicted in FIGS. 1A and 2A, the support post 20 is a manufactured shell 23 wrapped around a permanent vertical shaft or girder 21 extending from a pad depicted as mounting pad 22 on a substrate such as the terrain or ground 2 to a support end 24 at the canopy structure 10. The customer engagement system 30 is fixed to the shell 23 of the support post 20 between the mounting pad 22 and the canopy structure 10. The mounting pad 22 eliminates the need for bollards or other mounting structures to protect the customer engagement system 30 and provide the necessary balance for the customer engagement platform assembly 100.

Figure 1B:
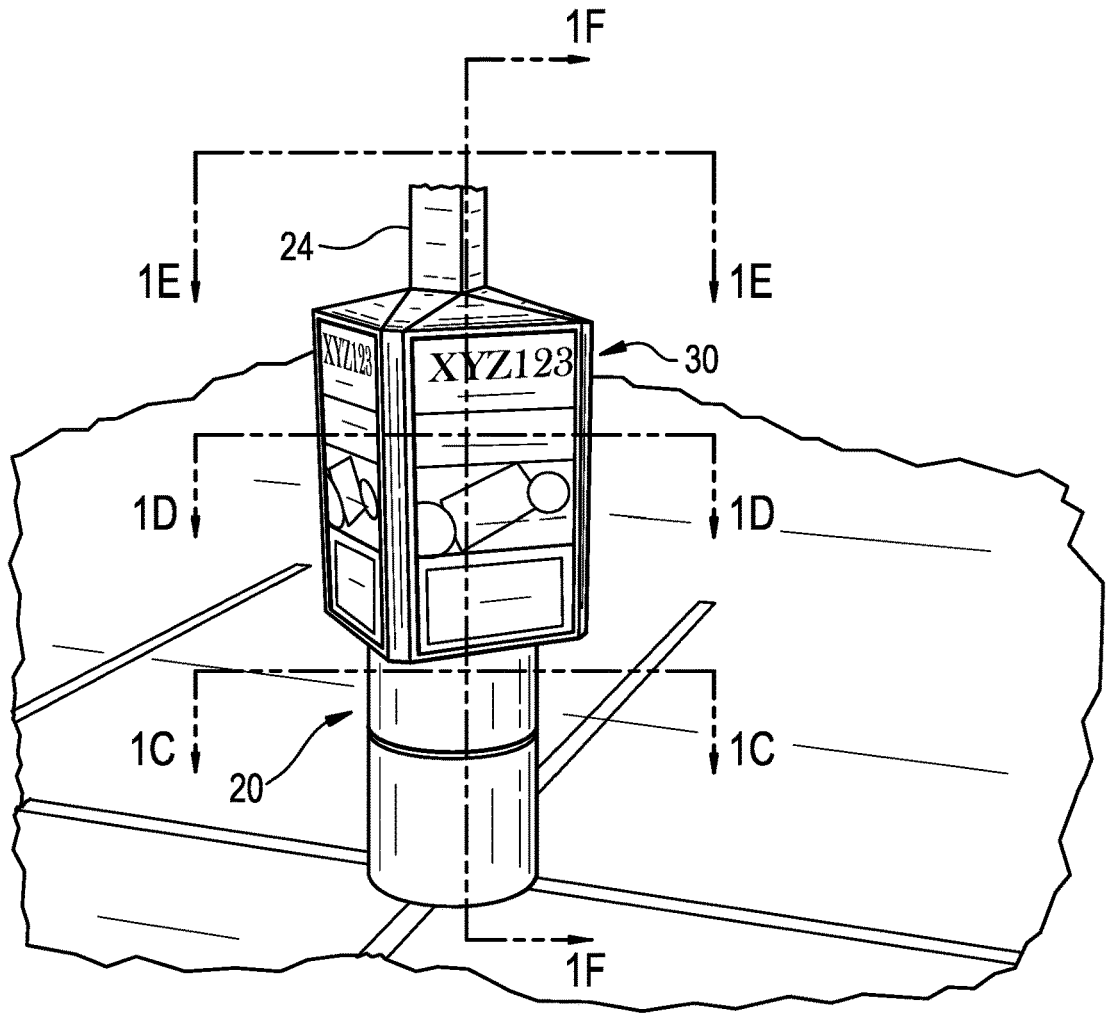
FIG. 1B is a partial perspective view of the customer engagement platform assembly of FIG. 1A.

FIG. 1B is a partial perspective view of the customer engagement platform assembly 100 of FIG. 1A, showing the customer engagement system 30 mounted to the support post 20 and the support end 24.

Figure 1C:
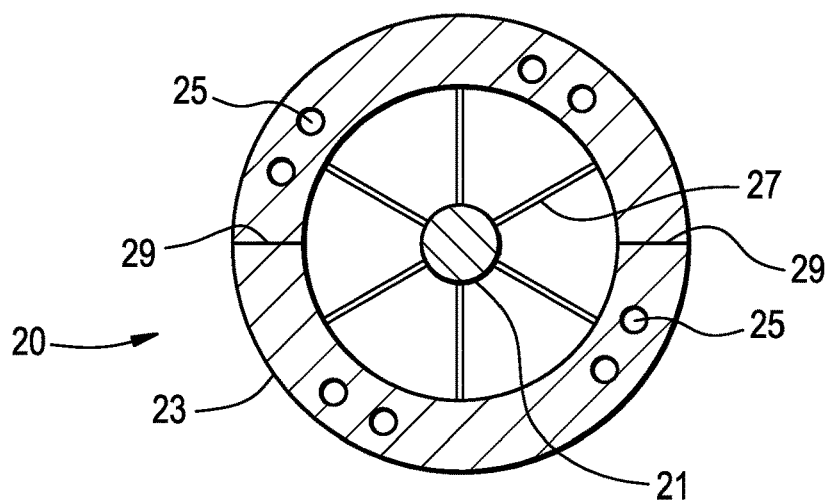
FIG. 1C is a top cross section view of the support post of the custom engagement platform assembly of FIG. 1B taken along section 1C-1C of FIG. 1B.

FIG. 1C depicts a top cross section view of the support post 20 of FIG. 1B taken along section 1C-1C of FIG. 1B. The support post 20 includes a shell 23 surrounding a girder 21. The shell 23 is secured to the girder via arms 27. The shell is formed of two semi-circular portions that adjoin at seam 29. The shell 23 may have a one-piece construction and hinge at one end of seam 29 to surround the girder 21 (not depicted). The shell 23 has a plurality of mounting holes 25 disposed therein.

Figure 1D:
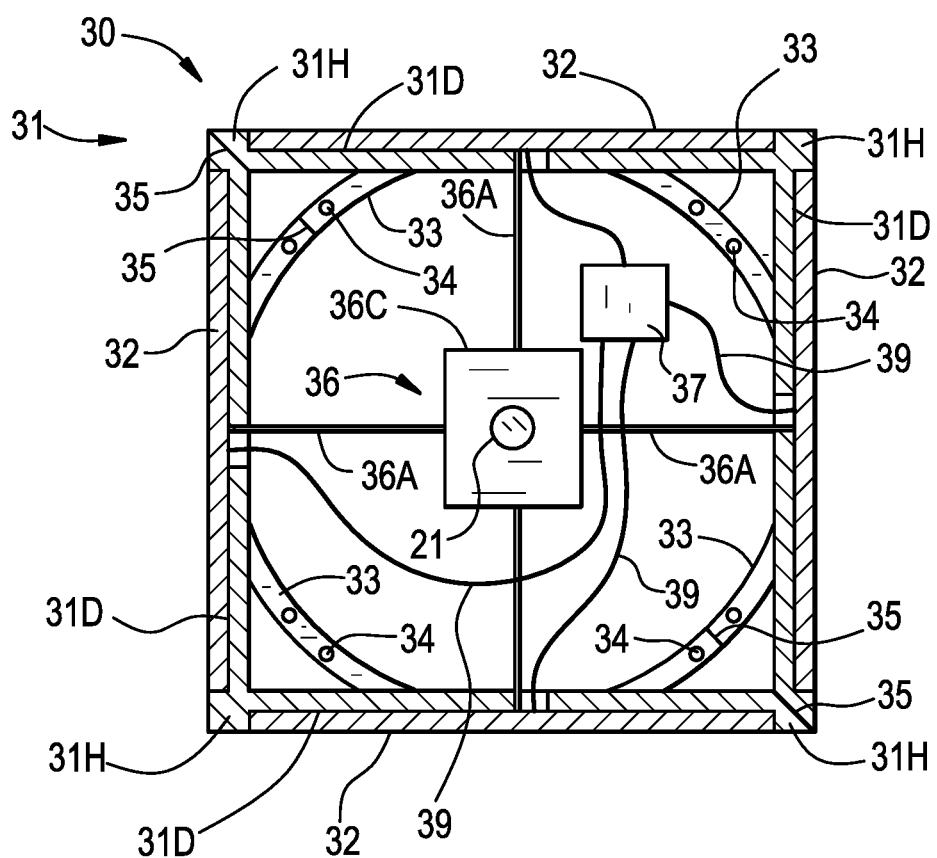
FIG. 1D is a top cross section view of the customer engagement system of the custom engagement platform assembly of FIG. 1B taken along section 1D-1D of FIG. 1B.

FIG. 1D depicts a top cross section view of the customer engagement system 30 of FIG. 1B taken along section 1D-1D of FIG. 1B. The customer engagement system 30 includes a frame 31 having a height extension section 31H formed in a rectangular shape defining a hollow interior. The height extension section 31H has a display mounting section 31D cutout of each exterior side surface. A communications device 32, for example, an audio video device or television (described in more detail below), is disposed in each display mounting section 31D of the height extension section 31H. The frame 31 surrounds the girder 21 and is secured thereto via bracket system 36. The bracket system 36 includes a shelving system having a support column 36C secured to the girder 21 and at least one arm 36A extending radially from the girder 21. The arms 36A extend through the height extension section 31H. The communication devices 32 are removably securable to the arms 36. The frame 31 has a flange 33 attached to the bottom surface of the height extension section 31H. The flange 33 has a plurality of through-holes 34 corresponding to the plurality of mounting holes 25 of the shell 23 for mounting the frame 31 to the shell 23 via fasteners, such as rivets, bolts, and the like. The height extension section 31H and flange 33 are each formed of two portions that adjoin at seams 35. The height extension section 31H is used to surround the girder 21 and to provide access to the internal area inside the height extension section 31H. The height extension section 31H may have a one-piece construction and hinge at one end of seam 35 to surround the girder 21 and provide internal access (not depicted). Access may also be provided via an access port, a window, or a hinged door (not depicted). The frame 31 houses a control unit 37 that is connected to the communication devices 32 via wires 39. The control unit 37 may have an integrated power unit for supply electrical power and control instructions to the communication devices 32. The control unit 37 includes at least one of network equipment, communication protocols, Internet protocol address targeting, geo-fencing, geo-targeting, online behavioral targeting, text bot and apps enabled communication protocols to enable communication and efficiency of services between the at least two entities.

Figure 1E:
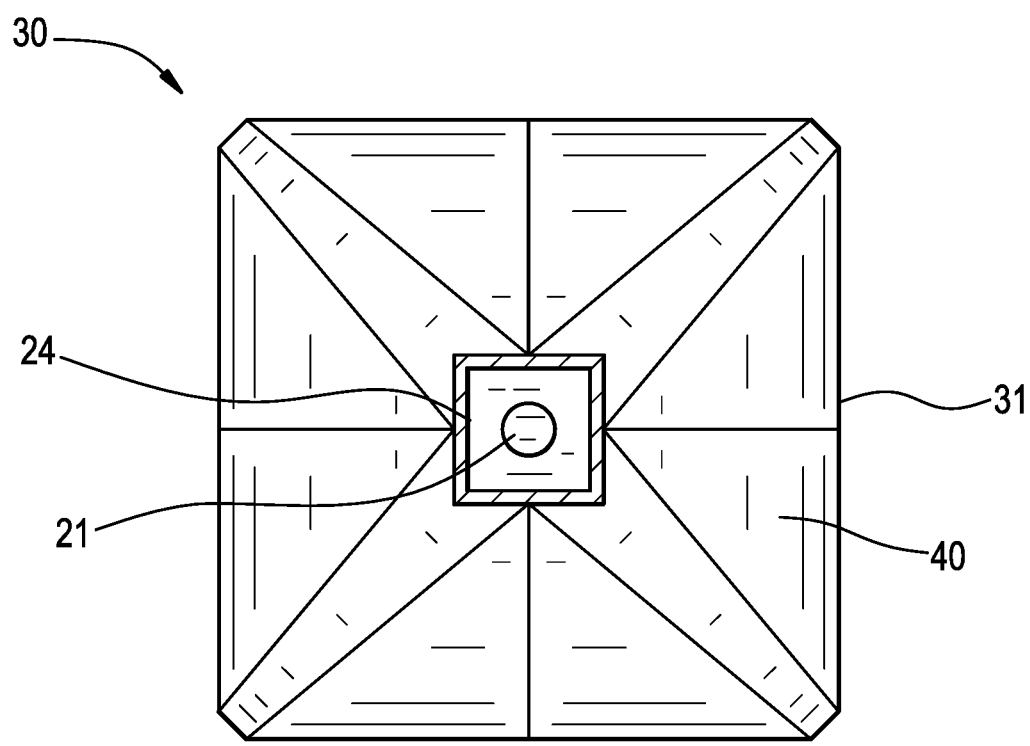
FIG. 1E is a top cross section view of the customer engagement system assembly of FIG. 1B taken along section 1E-1E of FIG. 1B.

FIG. 1E depicts a top cross section view of the customer engagement system assembly 100 of FIG. 1B taken along section 1E-1E of FIG. 1B. The support end 24 of the support post 20 surrounds the girder 21 and connects to the cover 40 to the frame 31 of the customer engagement system 30.

Figure 1F:
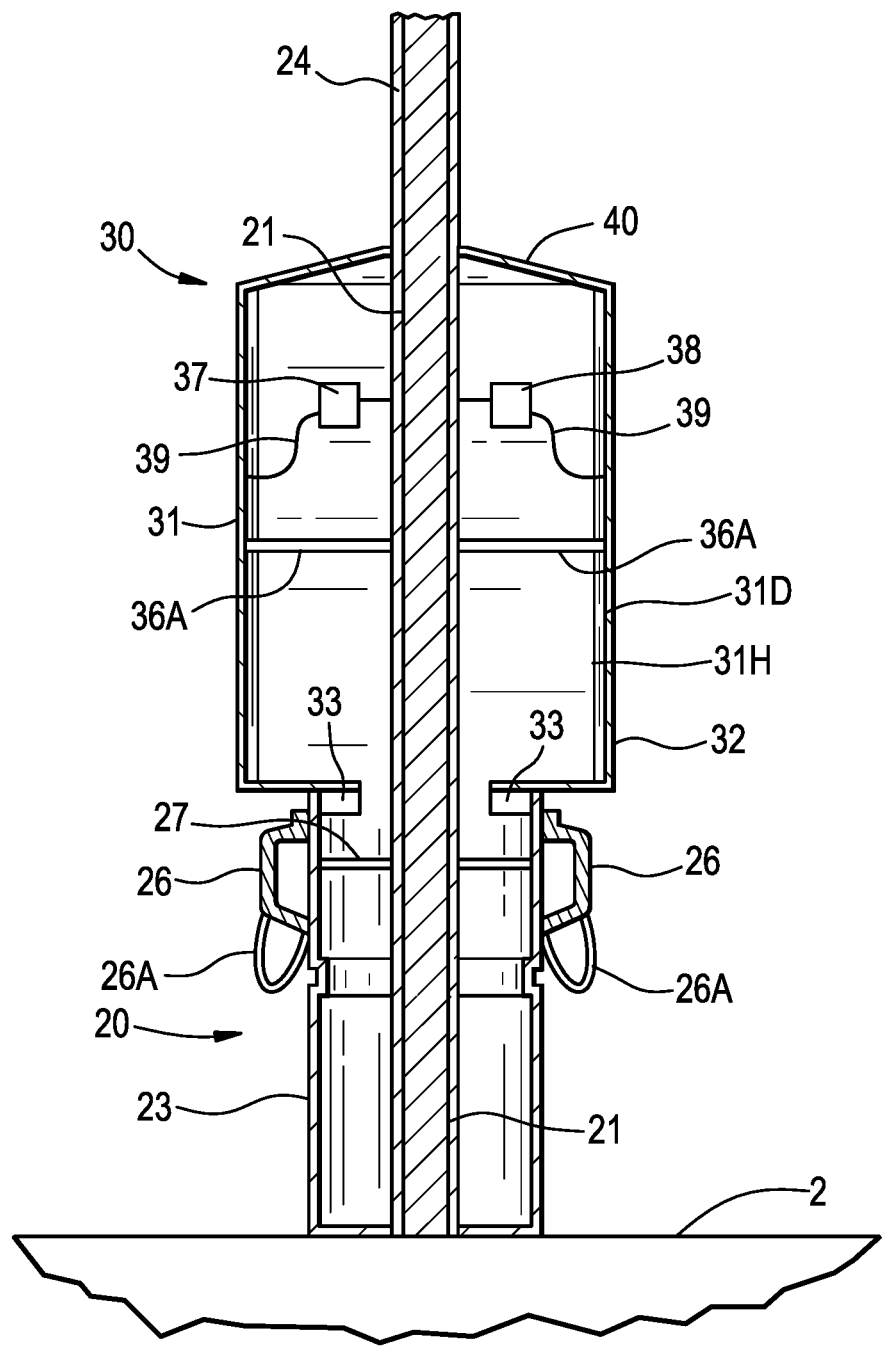
FIG. 1F is a side cross section view of the customer engagement system assembly of FIG. 1B taken along section 1F-1F of FIG. 1B.

FIG. 1F depicts a side cross section view of the customer engagement system assembly 100 of FIG. 1B taken along section 1F-1F of FIG. 1B. The girder 21 extends vertically through the shell 23 (see FIG. 1C), the frame 31 (see FIG. 1D), and the cover 40 (see FIGS. 1E and 1F) of the frame 31. The shell 23 is secured to the girder 21 via arms 27, as shown in FIG. 1C. The frame 31 is secured to the girder 21 via bracket system 36, as shown in FIGS. 1D and 1F. The support post 20 includes Electric Vehicle ("EV") charging stations 26 positioned along the shell 23 at predetermined intervals, as shown in FIG. 1F. Each EV charging station 26 includes an extendable power supply charging cable 26A to accommodate different vehicle parking positions and different vehicle charging port locations. The frame 31 is mounted to the shell 23 via the flange 33. In addition to the control unit 37, the frame 31 also houses a power supply 38 that is connected to the control unit 37 and the communication devices 32 via wires 39. The power supply 38 may also be integrated with the control unit 37, as shown in FIG. 1D.

Referring to FIGS. 1A and 2A, the canopy structure 10 is made up of two substantially planar members in the form of a first deck 12 and a second deck 14. The first deck 12 and the second deck 14 are substantially rectangular in shape and mate with one another to form a continuous edge along a valley 16. The first deck 12 is fixed to the second deck 14 along the valley 16 at a solar reception angle α. In the embodiment depicted in FIG. 2A, the solar reception angle α is approximately 130°, but the present invention is not limited thereto and contemplates other angles. An upper surface 13 of the first deck 12 defines a mounting surface for a plurality of solar photovoltaic modules 18 (depicted and described with respect to FIGS. 2B and 3 below). An under surface 15 of the first deck 12, the second deck 14, and/or the valley 16 engages one or more support posts 20. The valley 16 provides a drainage path for water and other elements that fall onto and collect on the first deck 12 and/or the second deck 14. One edge of the valley 16 is arranged such that the drainage path for the water and other elements naturally flows in a specific direction, due to the force of gravity. In the embodiment depicted in FIGS. 2B-3, the water and other elements naturally flow to one of the valleys 16A, 16B, due to the force of gravity. In other embodiments, the valley 16 directs water down the support post 20 and to a separate drain or the water is collected in a separate drainage tube (not depicted) to be directed to a convenient location.

In the embodiment depicted in FIGS. 2B-3, the customer engagement platform assembly 200 includes two canopy structures 10A, 10B mounted to a plurality of support posts 20. One of the canopy structures 10A is a mirror image of the other canopy structure 10B and the two canopy structures 10A, 10B are joined at an edge 17 of the first decks 12A, 12B opposite the valleys 16A, 16B (depicted in detail in FIG. 3). Referring to FIG. 2B, the support posts 20 mount to the under surface 15A, 15B of the first decks 12A, 12B and are placed at the intersection of four adjacent parking spaces (labeled for example as A, B, C, and D). The support posts 20 may be placed at various vehicle transient locations, including but not limited to in parking lots, at drive-through windows, at toll booths, in carwash lines, over bicycle racks, or pathways. The customer engagement platform assembly 200 provides shelter to customers parked in the parking spaces, shades the cars parked within the parking spaces, and protects the cars and customers from the elements such as snow or rain. The placement of the support posts 20 relative to the spaces and including support posts 20 of different diameters does not depart significantly from the present disclosure. In the embodiment depicted in FIGS. 2B-3, the support posts 20 are placed with one support post at the intersection of four unique parking spaces A, B, C, and D. This arrangement of support posts minimizes intrusions on the end users and their ability to park, maintaining the parking space size, while also predictably and beneficially influencing vehicle and pedestrian traffic flow.

In the embodiments depicted in FIGS. 1A-3, the solar photovoltaic modules 18 are electrically connected to DC/AC inverters within the customer engagement platform assembly 100, 200. The DC/AC inverters convert energy received by the solar photovoltaic modules 18 and store the energy locally in a Battery Energy Storage System ("BESS," not depicted) and/or send the energy to an electrical grid for sale to and/or use by others. The electrical energy generated by the solar photovoltaic modules can be sold directly to the property owner or a third party, can be stored, and can be utilized locally to power electric vehicles parked within the parking spaces or to power other devices such as lights or the customer engagement system 30. The electrical energy generated by the solar photovoltaic modules 18 is stored within the customer engagement platform assembly 100, 200 during hours in which there is less demand and provides the electrical energy to the electrical grid during hours in which there is much more demand for electrical energy from the electrical grid. The customer engagement platform assembly 100, 200 apportions the use of electricity depending on demand. Electricity stored in the BESS is selectively used during times of high demand for electricity in general to lower electrical consumption costs and when there are multiple uses of the electricity at the same time to reduce the peak electrical consumption costs.

Referring to FIGS. 1A-4, the customer engagement system 30 has a communications device 32 in the form of a digital video screen that incorporates real time advertisement technology to display relevant advertising, general information, or otherwise targeted messages to the users parked in the parking spaces. The communications device 32 disclosed herein includes but is not limited to auditory communications such as a speaker, incorporate lighting, and/or visual displays. FIG. 1A depicts three adjacent communications devices 32 each having four separate flat screens in a rectangular arrangement, with each communications device 32 above a concrete mounting pad 22. Each screen can be positioned to target an individual parking space and display advertising, information, or messages. FIG. 4 depicts two adjacent communications devices 32 as single wrap-around screens, with each communications device 32 above a concrete mounting pad 22. Separate flat or curved screens use in place of or in addition to the communications device 32 do not depart from the invention disclosed herein. The content displayed on the communications device 32 can target individual parking spaces by dividing the screen and displaying different advertising, information, or messages. The communications device 32 can target users based on geographic proximity to the customer engagement system 30. The advertising is targeted geographically, indirectly or directly to the end user based on IP targeting (targeting based on Individual Protocol addresses), geo-fencing or other forms of geo-targeting, and other online behavioral targeting algorithms. A Bluetooth device, such as a cell phone or other relevant identification signifiers, pairs with the customer engagement system 30. The media engagement system 30 is connected to the Internet by a wired or wireless connection and may be updated and monitored remotely. The communications device 32 also provides real time information through the wired or wireless connection. The concrete mounting pad 22 raises the height of the communications device 32 relative to the ground 2 protecting it from damage and making it easier to view.

In the embodiment depicted in FIG. 4, a first support post 20A includes four EV charging stations 26 (two fully visible, but four charging stations 26 are equidistantly spaced around the circumference of the support pole 20), with one charging station 26 arranged adjacent to each of the parking spaces A, B, C, D, and a second support post 20B omits any EV charging stations. The number of EV charging stations 26 per support post 20 and the amount of support posts 20 with EV charging stations 26 in a single customer engagement platform assembly 100 is customizable. Each EV charging station 26 includes an extendable power supply charging cable 26A to accommodate different vehicle parking positions and different vehicle charging port locations. The second support post 20B includes the wiring for connecting to the electrical grid, to render the second support post 20B "EV charger ready," or to ease the addition of EV chargers 26 to the second support post 20B in the future.

Figure 5:
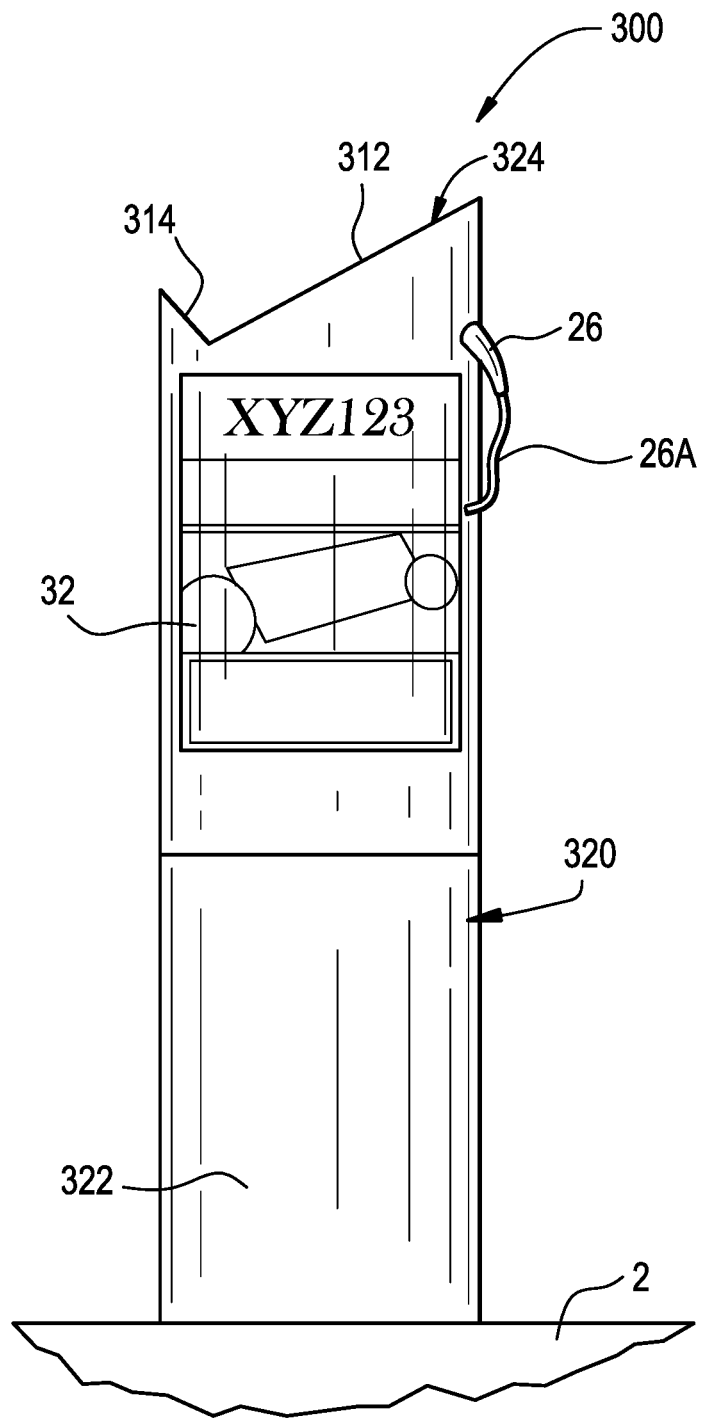
FIG. 5 is a side view of a third embodiment of a customer engagement platform assembly according to the present disclosure.

FIG. 5 depicts an embodiment of a customer engagement platform assembly 300 in which the first deck 312 and the second deck 314 are integrated into the support end 324 of the support post 320. The support post 320 includes a mounting pad 322 such that the communications device 32 is positioned at a height above the ground 2 that is convenient for viewing by a user sitting in a vehicle or standing in front of the communications device 32, such as about 5 feet to about 6 feet high, or "eye level." The communications device 32 has a curvilinear screen that wraps partially around the support post 320, however the present invention is not limited thereto and contemplates the communications device 32 having, including but not limited to, a curvilinear screen that wraps fully around the support post 320 or a linear screen, as described above. A single EV charging station 26 interrupts the communications device 32. The EV charging station 26 includes an extendable power supply charging cable 26A to accommodate different vehicle parking positions and different vehicle charging port locations. The customer engagement platform assembly 300 can be placed on sidewalks, curbs, or at other locations adjacent to parking spaces.

Figure 6A:
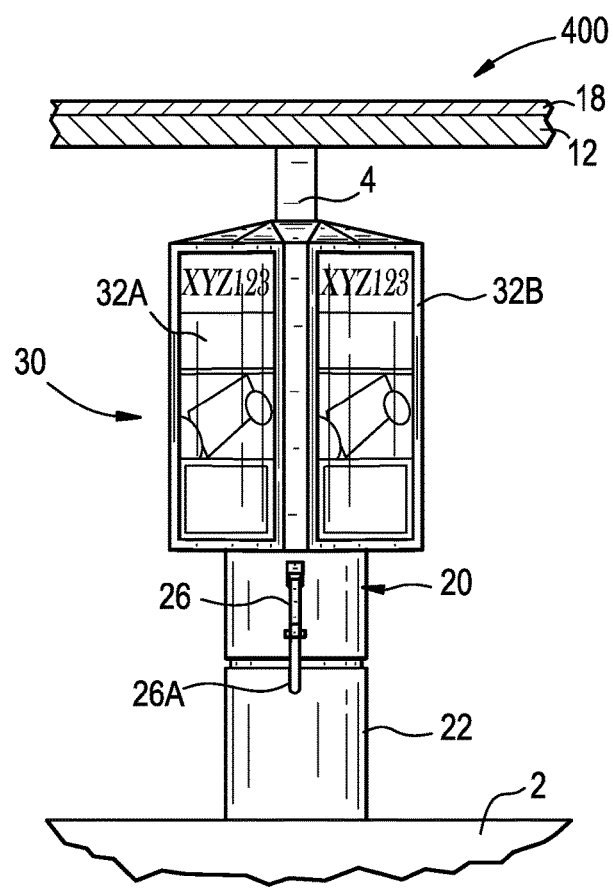
FIG. 6A is a front cross section view of a fourth embodiment of a customer engagement platform assembly according to the present disclosure with the first deck and the solar photovoltaic modules depicted in cross section for convenience used with the customer engagement system of FIG. 1A.
Figure 6B:
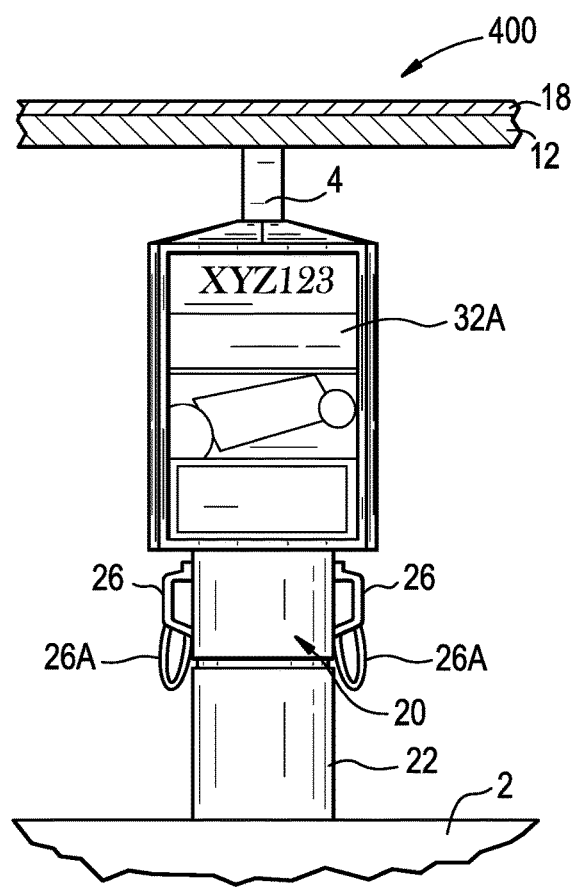
FIG. 6B is a side cross section view of the customer engagement platform assembly of FIG. 6A with the first deck and the solar photovoltaic modules depicted in cross section for convenience.

Referring to FIGS. 6A and 6B, a customer engagement platform assembly 400 includes two communications devices 32A, 32B arranged perpendicular to one another such that the communication devices 32A, 32B is directed toward adjacent parking spaces on one side of the support post 20. The customer engagement platform assembly 400 may also include communication devices 32C, 32D (not depicted) arranged perpendicular to one another on the opposing side of the support post 20 such that the customer engagement system 30 has a rectangular arrangement. An EV charging station 26 is mounted in the shell of the support post 20 between each end of the communications devices 32A, 32B. Each EV charging station 26 includes an extendable power supply charging cable 26A to accommodate different vehicle parking positions and different vehicle charging port locations. As shown in FIGS. 6C and 6D, the communication devices 32A and 32B may each wrap around opposite sides of the shell of the support post 20.

Figure 7A:
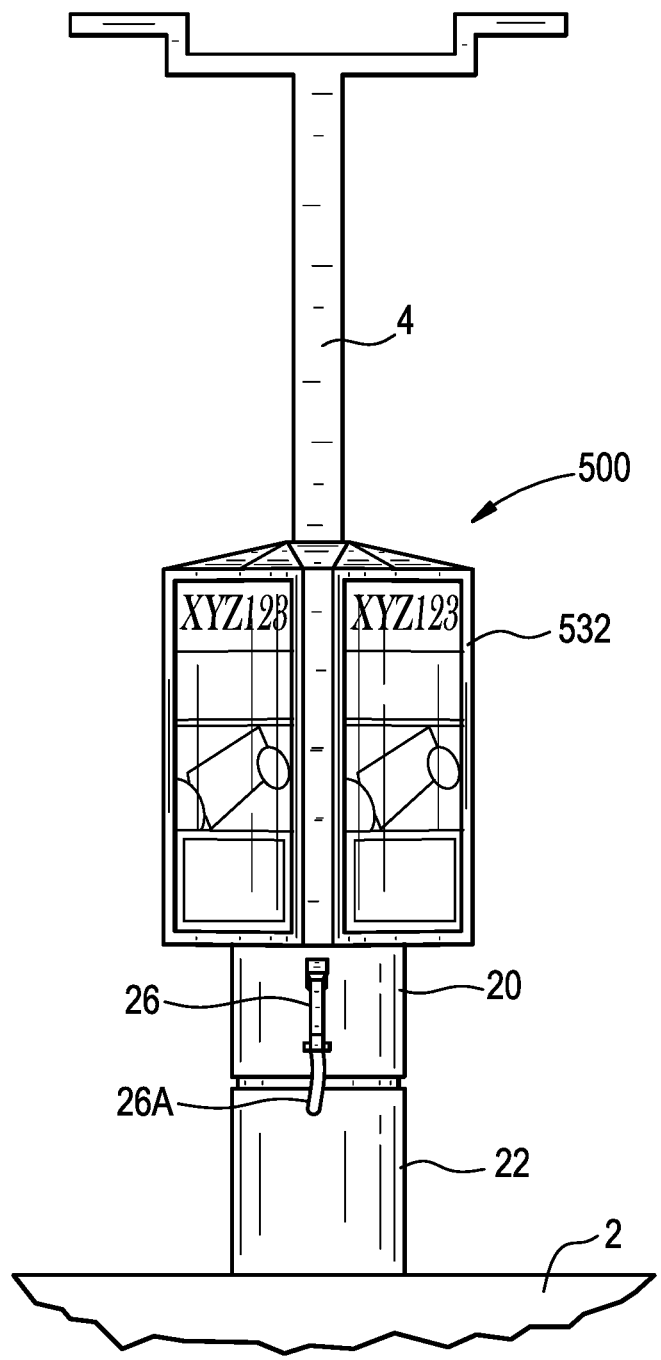
FIG. 7A is a front view of a fifth embodiment of a customer engagement platform assembly according to the present disclosure used with the customer engagement system of FIG. 1A.
Figure 7B:
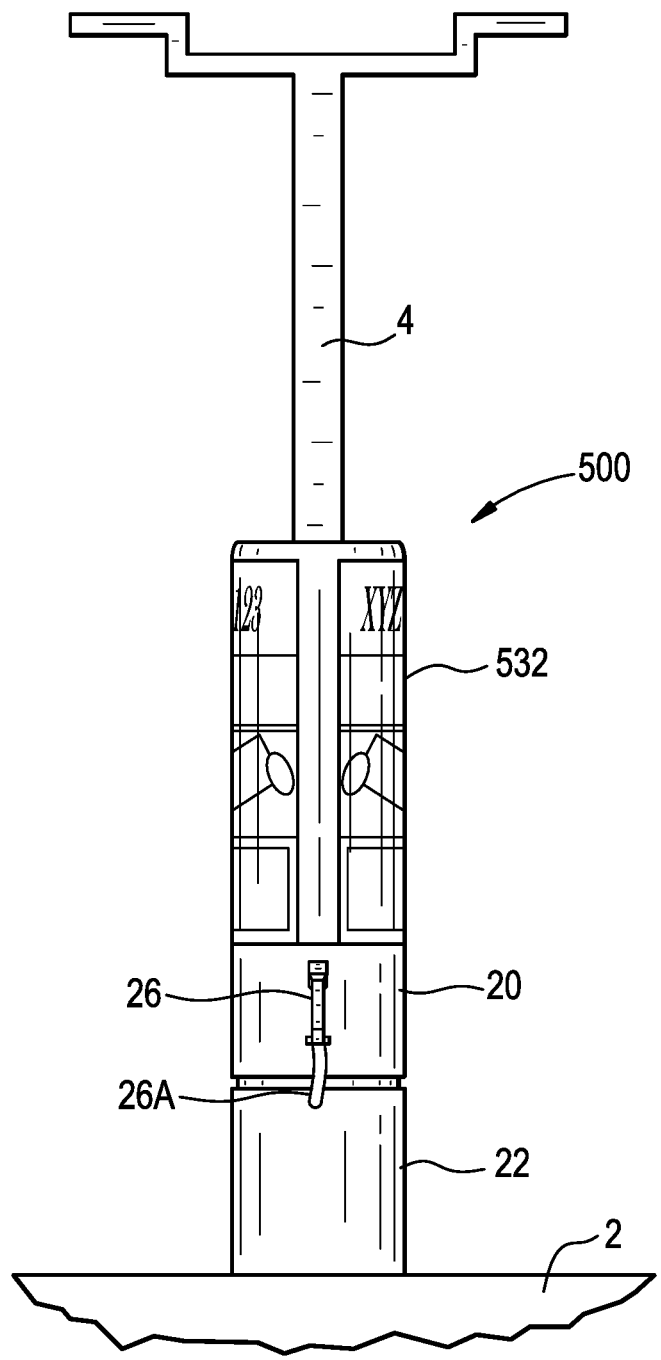
FIG. 7B is a front view of the customer engagement platform assembly of FIG. 7A used with the customer engagement system of FIG. 2A.

FIG. 7A depicts a customer engagement platform assembly 500 incorporated into a light post 4. The light post 4 is positioned in or adjacent to a parking lot. The depicted communications device 532 is powered by an internal battery (not depicted) or from an electrical grid connected thereto. The communications device 532 includes four separate flat screens in a rectangular arrangement, as discussed above regarding FIG. 1A. As shown in FIG. 7B, the communications device 532 may include one or more wraparound screens, as discussed above regarding FIGS. 4 and 6C.

Figure 8:
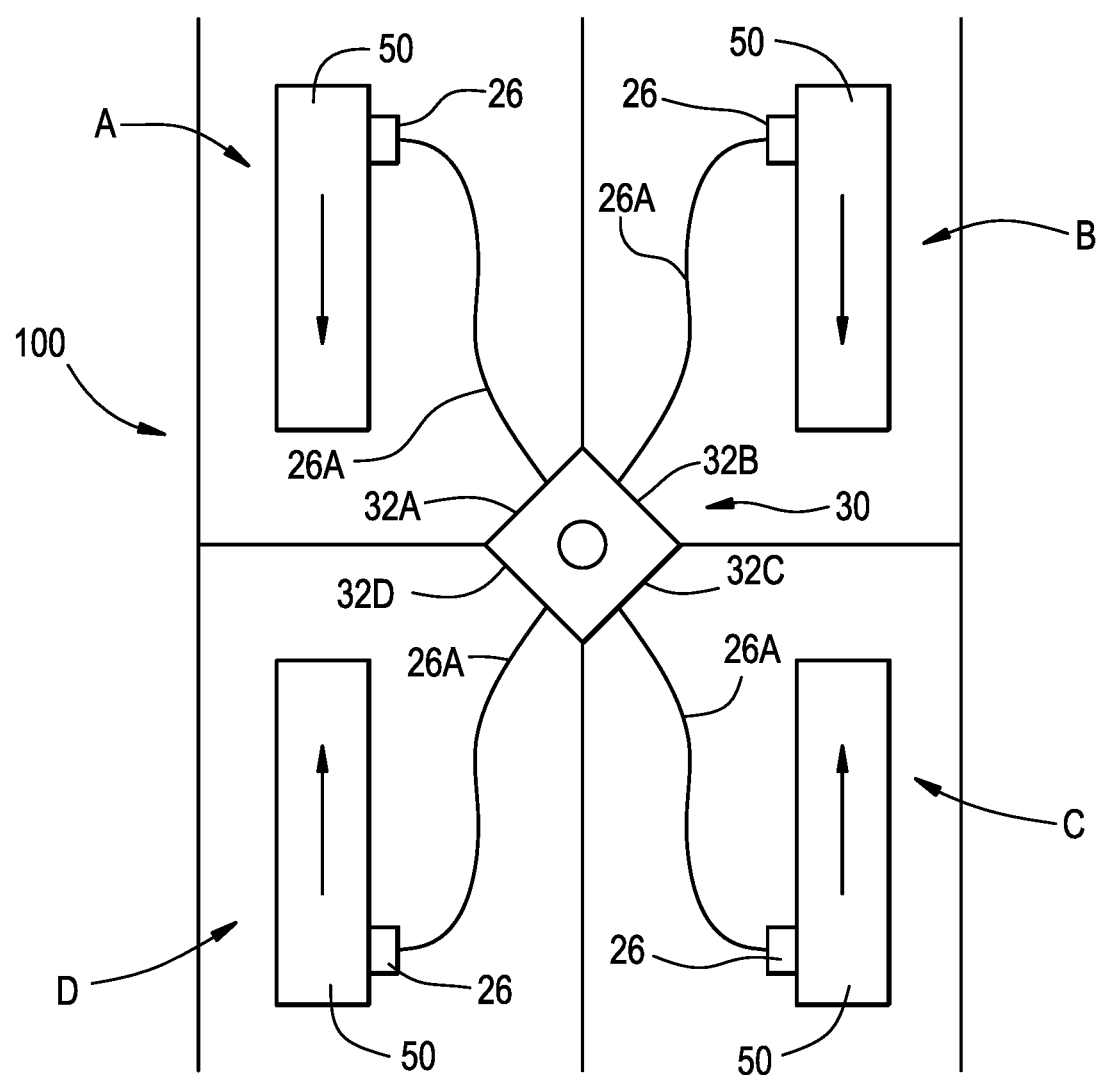
FIG. 8 is a top view of a customer engagement platform assembly according to the present disclosure installed at the intersection of four adjacent parking spaces.

FIG. 8 depicts a customer engagement platform assembly 100 positioned at the junction of adjacent vehicle transient locations (such as parking spaces) A, B, C, and D. The customer engagement platform assembly 100 includes a customer engagement system 30 mounted to a support post 20 as described above. The customer engagement system 30 includes four communication devices 32 (such as audio video device or television), each of which having a display that is directed toward a respective vehicle transient location A, B, C, or D. For example, communication device 32A is directed toward vehicle transient location A, communication device 32B is directed toward vehicle transient location B, communication device 32C is directed toward vehicle transient location C, and communication device 32D is directed toward vehicle transient location D. The displays of communication devices 32 may have linear or curvilinear screens. The customer engagement system 30 may include one communication device 32 having a display that wraps around the support post 20, or two communication devices 32 each having a display that wraps partially around the support post 20. Such warp around communication devices 32 are configured to display separate windows on the screen for the respective adjacent vehicle transient locations A, B, C, and D. The customer engagement platform assembly 100 includes four EV charging stations 26 configured to charge electric vehicles 50 positioned in the vehicle transient locations A, B, C, and D. Each EV charging station 26 is positioned for use in a respective vehicle transient location A, B, C, or D. Each EV charging station 26 includes an extendable power supply charging cable 26A to accommodate different vehicle parking positions and different vehicle charging port locations. While the embodiment in FIG. 8 depicts a customer engagement platform assembly 100 positioned at the junction of four adjacent vehicle transient locations, the present invention is not limited thereto and contemplates other configurations, including but not limited to the customer engagement platform assembly 100 being positioned adjacent one vehicle transient location, or at the junction of two or three adjacent vehicle transient locations.

In an alternate embodiment (not depicted), the support post is mounted only to the canopy structure. The weight of the mounting pad and the support post maintains the customer engagement platform assembly in place.

The height of the canopy structure 10 relative to the ground 2 accommodates a variety of vehicle heights and includes above average automotive clearance (such as clearance for Recreational Vehicles).

The customer engagement system 30 includes advanced networking equipment to connect to and in some cases extend wireless or wired communication systems such as the Internet.

A fully integrated customer engagement platform assembly 100 is a technology enabled consumer/citizen engagement platform for expanding commerce opportunities in outdoor commercial spaces. The customer engagement platform assembly 100 may include both cylindrical and rectangular shaped substrate materials that are fixed to a typical concrete parking lot pole concrete base 22 mounted on a terrain such as the parking lot substrate 2 (concrete, asphalt, and the like) with a support beam 21 centered through concrete base and raising up through the customer engagement platform assembly 100 for structural support.

The support post 20 is positioned within a parking lot design to maintain vehicle transient locations (e.g., parking spaces, etc.) space sizing and allow customer engagement platform assembly 100 to be installed at any location within the parking lot (favorably influencing expansion opportunities and traffic flow initiatives).

The customer engagement system 30 displays advertisements and/or notifications that are customized in real-time to each surrounding parking space. Customer engagement platform assembly 100 provides real estate in form of 1, 2, or 4 digital screens to support advertisements and information dissemination that is customized to each of the vehicle transient locations appropriate to needs of host/proprietor.

Customer engagement platform assembly 100 houses and supports network equipment to include communication protocols including, but not limited to Internet protocol address targeting, geo-fencing and other forms of geo-targeting, and online behavioral targeting, text bot and/or app enabled communication protocol to enable communication and efficiency of services between the customer and proprietor.

The customer engagement platform assembly 100 has external features that are capable of being aesthetically changed to be consistent in appearance and branding of a partner, client, host and/or proprietor.

The customer engagement platform assembly 100 can integrate a weather decking canopy to provide shelter for persons, goods and their vehicles, and customer engagement systems (and technology utilized to inform and connect with persons/consumers in and around such media engagement systems).

The customer engagement platform assembly 100 can include weather proofing in the form of a traditional shaded canopy structure 10 consisting of fabric or metal decking materials with a first deck 12 and a second deck 14 fixed to one another along a valley 16. An upper surface 13 of the first deck 12 defines a mounting surface for a fabric or metal decking substrate with the function of providing shading and weather protection. The first deck 12, the second deck 14, and the valley 16 all have a bottom surface 15. At least one support post 20 extends from a mounting pad 22 to the bottom surface 15 of the first deck 12, the second deck 14, and/or the valley 16.

The customer engagement platform assembly 100 can include weather proofing in the form of a solar photovoltaic canopy structure 10. The solar canopy structure 10 has a first deck 12 and a second deck 14 fixed to one another along a valley 16. An upper surface 13 of the first deck 12 defines a mounting surface for solar photovoltaic modules 18 that each receive energy from light rays and convert the energy into electricity. The first deck 12, the second deck 14, and the valley 16 all have a bottom surface 15. At least one support post 20 extends from a mounting pad 22 to the bottom surface 15 of the first deck 12, the second deck 14, and/or the valley 16. The fully integrated customer engagement platform assembly 100 can include vehicle charging capabilities with either two or four EV charging stations 26 disposed on the support post 20 with charging components largely located internal to the customer engagement platform assembly 100 with electricity charging services provided directly to the customer. Each EV charging station 26 includes an extendable power supply charging cable 26A to accommodate different vehicle parking positions and different vehicle charging port locations.

Photovoltaic electricity generated can be electrically interconnected with the site to utilize generated electricity to facilitate offset of realized energy needs of customer engagement system 30 and other site usage.

In some embodiments, the photovoltaic system design is electrically interconnected to the electricity grid and electricity generations is provided directly to utility grid programs.

The customer engagement platform assembly 100 may be integrated with battery storage equipment to store onsite electricity generation or onsite grid provided electricity.

Stored energy system can be electrically designed and interconnected to utilize stored energy to facilitate offset of realized energy needs of customer engagement system 30 and other site usage.

In some embodiments, the energy storage system design is electrically interconnected to the electricity grid and stored energy is provided directly to utility grid programs.

The customer engagement platform assembly 100 may be integrated with EV charging stations 26. EV charging stations 26 are fully integrated into the customer engagement system 30 disposed on the support post 20 and largely internal to the customer engagement platform assembly 100 and the electricity is available and provided directly to the EV charging customer.

EV charger application integration includes at least one and up to four EV charging stations 26 per customer engagement platform assembly 100. Each EV charging station 26 includes an extendable power supply charging cable 26A to accommodate different vehicle parking positions and different vehicle charging port locations.

Although the present invention has been disclosed and described with reference to certain embodiments thereof, it should be noted that other variations and modifications may be made, and it is intended that the following claims cover the variations and modifications within the true scope of the invention.

What is claimed is:

1. A customer engagement platform assembly comprising:
a support post configured to be secured to a terrain, a girder disposed in and fixedly secured to the support post, the support post comprising a shell surrounding the girder and secured to the girder by radially extending arms, the shell comprising two semi-circular portions adjoined to one another at first seams;
a frame having a hollow interior defined by a height extension section, the height extension section comprising at least two portions, the frame being removably secured to the support post, the height extension section having a display mounting section formed therein and a cover extending over a top portion of the display mounting section, the girder extending into the hollow interior of the frame, a flange attached to a bottom surface of the height extension section, the flange removably securing a bottom portion of the height extension section to a top portion of the support post, the height extension section and the flange are each formed of two portions that adjoin at second seams, which provide access to an internal area inside the height extension section;
at least one audio video communication device disposed in the display mounting section, the at least one audio video communication device being configured for communicating information therefrom, and the frame houses the at least one audio video communication device and supports an electrical power supply and a control unit both of which are in the hollow interior of the frame and in communication with the at least one audio video communication device;
a bracket system in fixed relation to the girder, located at least partially inside the frame and extending through the frame, the at least one audio video communication device being removably secured to the bracket system; and
the girder extending upwardly out of the cover and an uppermost end of the support post being connected to a canopy structure which is located above the cover.

2. The customer engagement platform assembly of claim 1, wherein the display mounting section has a substantially cylindrical exterior surface and the at least one audio video communication device has an arcuate shape complementary to the cylindrical exterior surface of the mounting section.

3. The customer engagement platform assembly of claim 1, wherein the display mounting section has a rectangular cross section and has at least two flat exterior surfaces and the at least one audio video communication device has a flat shape complementary to the at least two flat exterior surfaces of the mounting section.

4. The customer engagement platform assembly of claim 1, further comprising at least one electric vehicle charging station disposed on the frame and in electrical communication with the power supply, the at least one electric vehicle charging station being configured to charge a battery for an electric vehicle.

5. The customer engagement platform assembly of claim 1, wherein the control unit comprises at least one of network equipment, communication protocols, Internet protocol address targeting, geo-fencing, geo-targeting, online behavioral targeting, text bot and apps enabled communication protocols.

6. The customer engagement platform assembly of claim 1, wherein the canopy structure comprises a first deck and a second deck fixed to one another along a valley.

7. The customer engagement platform assembly of claim 1, wherein the canopy structure comprises an upwardly facing mounting surface having at least one of a fabric and a metal substrate configured to provide shading and weather protection for the customer engagement platform assembly.

8. The customer engagement platform assembly of claim 1, wherein the canopy structure comprises an upwardly facing mounting surface having at least one solar photovoltaic module configured to receive energy from light rays and convert the energy into electricity.

9. The customer engagement platform assembly of claim 8, wherein the at least one solar photovoltaic module is in electrical communication with the electrical power supply and the control unit both of which are in communication with the at least one audio video communication device.

10. The customer engagement platform assembly of claim 9, further comprising at least one electric vehicle charging station disposed on the frame and in electrical communication with the electrical power supply, the at least one electric vehicle charging station being configured to charge a battery for an electric vehicle.

11. The customer engagement platform assembly of claim 8, wherein the at least one solar photovoltaic module is in electrical communication with at least one of a utility electric grid, a battery storage device and a remote electrical load spaced apart from the customer engagement platform assembly.

12. The customer engagement platform assembly of claim 1, wherein the height extension section has at least one access feature configured to provide access to the internal area inside the height extension section.

13. The customer engagement platform assembly of claim 12, wherein the at least one access feature comprises at least one of an access port, a window, a hinged door and a multiple piece assembly.

14. An arrangement of customer engagement platform assemblies according to claim 1, the arrangement comprising a first vehicle transient location located on a terrain and a second vehicle transient location located on the terrain, the first vehicle transient location being positioned adjacent to the second vehicle transient location;

the customer engagement platform assembly positioned at a junction between the first vehicle transient location and the second vehicle transient location, the customer engagement platform assembly comprising a first of the at least one audio video communication device and a second of the at least one audio video communication device, the first of the at least one audio video communication device being positioned towards and viewable from the first vehicle transient location and the second of the at least one audio of the video communication device being positioned towards and viewable from the second vehicle transient location.

15. The arrangement of customer engagement platform assemblies of claim 14, further comprising at least one electric vehicle charging station disposed on the customer engagement platform assembly, the at least one electric vehicle charging station being accessible from at least one of the first vehicle transient location and the second vehicle transient location.

16. The customer engagement platform assembly of claim 1, wherein the radially extending arms extend through the height extension section and are secured to the at least one audio video communication device.

\* \* \* \* \*